United States Patent [19]

Vanderpool

[11] 4,199,677
[45] Apr. 22, 1980

[54] RECORD DECODING SYSTEM AND METHOD UTILIZING LOGARITHMIC TECHNIQUES

[75] Inventor: James L. Vanderpool, Centerville, Ohio

[73] Assignee: Monarch Marking Systems, Inc., Dayton, Ohio

[21] Appl. No.: 931,264

[22] Filed: Aug. 4, 1978

Related U.S. Application Data

[63] Continuation of Ser. No. 758,152, Jan. 10, 1977, abandoned.

[51] Int. Cl.² .................. G06K 7/10; G08C 9/06; G11B 5/09
[52] U.S. Cl. ............................ 235/463; 250/555; 360/42
[58] Field of Search ............... 235/463, 462, 449, 472; 360/42; 250/566, 568, 569, 555; 340/146.3 F, 146.3 Z

[56] References Cited

U.S. PATENT DOCUMENTS

| 3,784,792 | 1/1974 | Dobras | 235/463 |
| 3,854,036 | 12/1974 | Gupta et al. | 235/463 |
| 3,886,521 | 5/1975 | Dobras | 235/463 |
| 3,887,792 | 6/1975 | Williams | 235/463 |
| 4,058,708 | 11/1977 | Sherer et al. | 235/92 CC |

*Primary Examiner*—Daryl W. Cook
*Attorney, Agent, or Firm*—Mason, Kolehmainen, Rathburn & Wyss

[57] ABSTRACT

A bar code reader employs a microprocessor for decoding data contained in a bar code record and a logarithmic converter ahead of the microprocessor for providing to the microprocessor signals indicative of the logarithms of the widths of the scanned bars and spaces. The base of the logarithms used by the logarithmic converter is selected in a predetermined manner to maximize the resolution of the system for the particular microprocessor used, and to reduce the complexity of the system.

21 Claims, 5 Drawing Figures

RECORD DECODING SYSTEM AND METHOD UTILIZING LOGARITHMIC TECHNIQUES

CROSS-REFERENCE TO RELATED APPLICATION

This is a continuation patent application of copending patent application Ser. No. 758,152, filed on Jan. 10, 1977, now abandoned.

BACKGROUND OF THE INVENTION

A. Field of the Invention

This invention relates generally to bar code readers, and more particularly, to bar code readers utilizing logarithmic converters for providing to a microprocessor signals indicative of the logarithm of the width of the bars and spaces of a bar code record.

B. Description of the Prior Art

Bar code record readers are known. One such bar code reader is described in related U.S. Pat. Nos. 3,784,792 and 3,886,521 issued to Bruce W. Dobras, assigned to the same assignee as the assignee of the present invention, and incorporated herein by reference.

The system disclosed in the referenced patents utilizes a scanner for scanning a coded record. The scanner controls a plurality of counters that accumulate counts proportional to the widths of the individual bars and spaces being scanned. A determination of whether a particular bar or space is wide or narrow is made by taking the ratio of the accumulated counts corresponding to two of the scanned bars or spaces, and comparing the resultant ratio with a pair of constants. If the ratio thus obtained is larger than a first constant, the first scanned bar or space is considered to be wider than the second scanned bar or space. If the ratio is less than a second constant, then the first scanned bar or space is considered to be narrower than the second scanned bar or space. If the value of the ratio falls between the values of the first and second constants, the bars or spaces are considered to have equal widths.

While systems of the type described in the above referenced patent operate satisfactorily, the advent of microprocessors has made it possible to reduce the complexity while increasing the flexibility and versatility of such systems. However, the nature of the bar code scanning process is such that the ratio of numbers representative of the widths of the two bars or spaces must rapidly be obtained with an accuracy beyond the capability of the present day integrated circuit microprocessors. Consequently, multiple microprocessors must be utilized, or the width data must be compressed prior to taking the ratio.

Two such data compression systems are disclosed in U.S. Pat. Nos. 3,854,036 and 3,887,792. The system described in the U.S. Pat. No. 3,854,036 utilizes a read-only memory for converting the width representative counts to logarithmic representations of the widths. These logarithmic representations may readily be subtracted from each other by a microprocessor in order to determine the ratios of the widths of the various individual bars and spaces. Such a logarithmic data compression system permits a microprocessor to be used, but no attempt has been made to select a base for the logarithmic conversion that provides optimal resolution for a given read-only memory and microprocessor. The system described in the U.S. Pat. No. 3,887,792 utilizes a digital log-time generator to compress the data, but again no attempt is made to optimize the accuracy of the system by selecting an appropriate logarithmic base. Consequently, either accuracy must be sacrificed, or the decoding system must be made more complex than necessary.

SUMMARY OF THE INVENTION

Accordingly, it is an object of the present invention to provide an improved bar code scanning system that overcomes many of the disadvantages of the prior art scanning systems.

It is another object of the present invention to provide an improved bar code reader having improved accuracy and reduced complexity relative to the prior art systems.

It is yet another object of the invention to provide a bar code reader utilizing a linear to logarithmic converter for providing signals indicative of the logarithms of the widths of the various individual bars and spaces, with the base of the logarithmic indications being selected to provide optimum accuracy.

In accordance with a preferred embodiment of the invention, a combination of a clock and a counter is used to generate digital indications linearly related to the widths of various bars and spaces. A read-only memory having a predetermined number of inputs and a predetermined number of outputs is addressed by the counter, and has stored in its memory locations numbers representative of the logarithms of the various digital indications. The various locations are sequentially addressed by the digital indications from the counter and cause the read-only memory sequentially to provide signals indicative of the logarithms of each of the individual bars and spaces.

In accordance with an important aspect of the invention, the base of the logarithms stored in the various memory locations is determined in a predetermined manner from the number of inputs and outputs of the read-only memory and by the expected ratios of the widths of the bars and spaces. This maximizes the accuracy of the system for any read-only memory or microprocessor that may be utilized.

DESCRIPTION OF THE DRAWINGS

These and other objects and advantages of the present invention may be readily ascertained from the following detailed description and attached drawings, wherein.

DETAILED DESCRIPTION OF THE PREFERRED EMBODIMENT

Figure 1A:
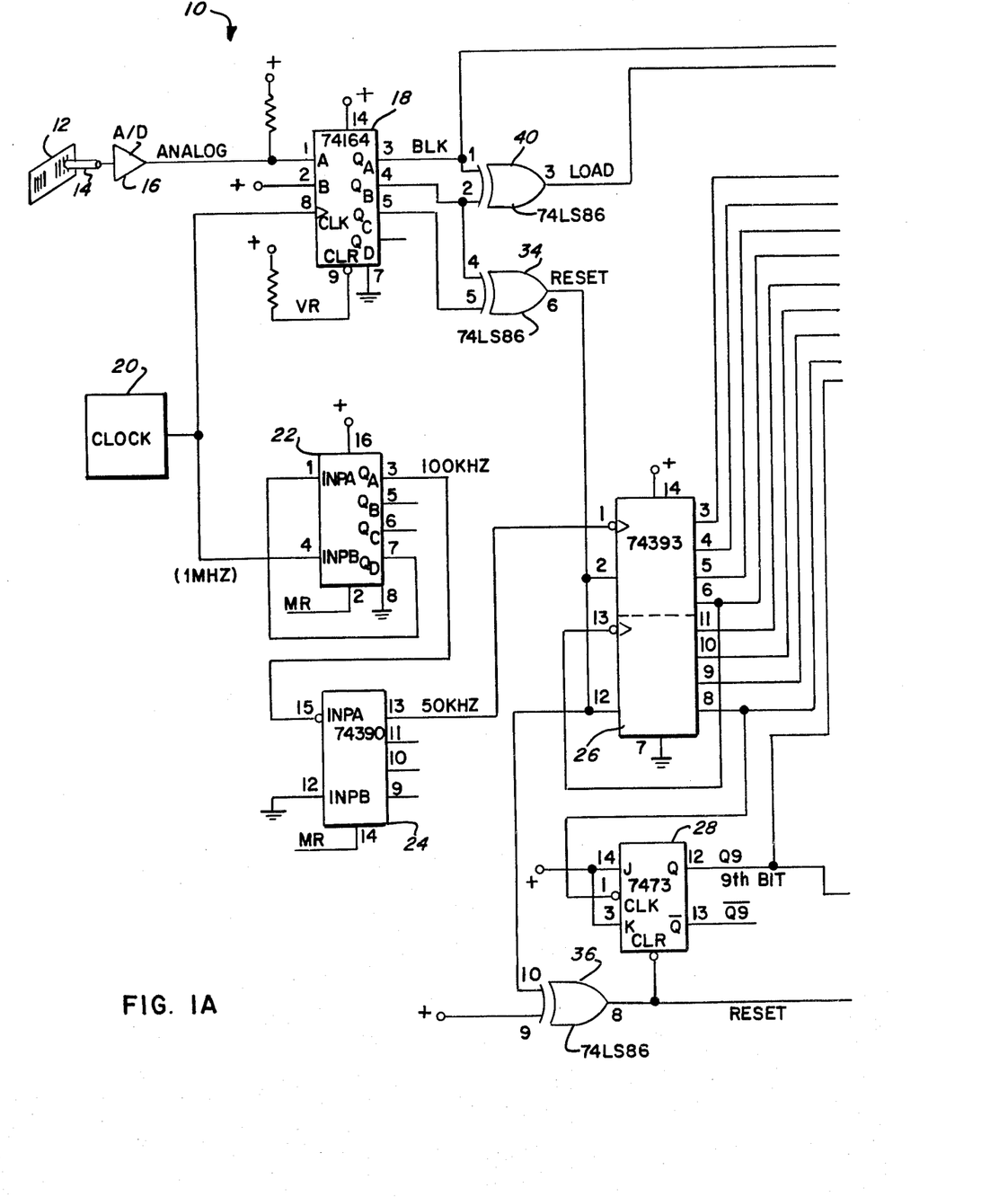
FIGS. 1a and 1b form a schematic diagram of a logarithmic converter usable in the decoding system according to the present invention.
Figure 1B:
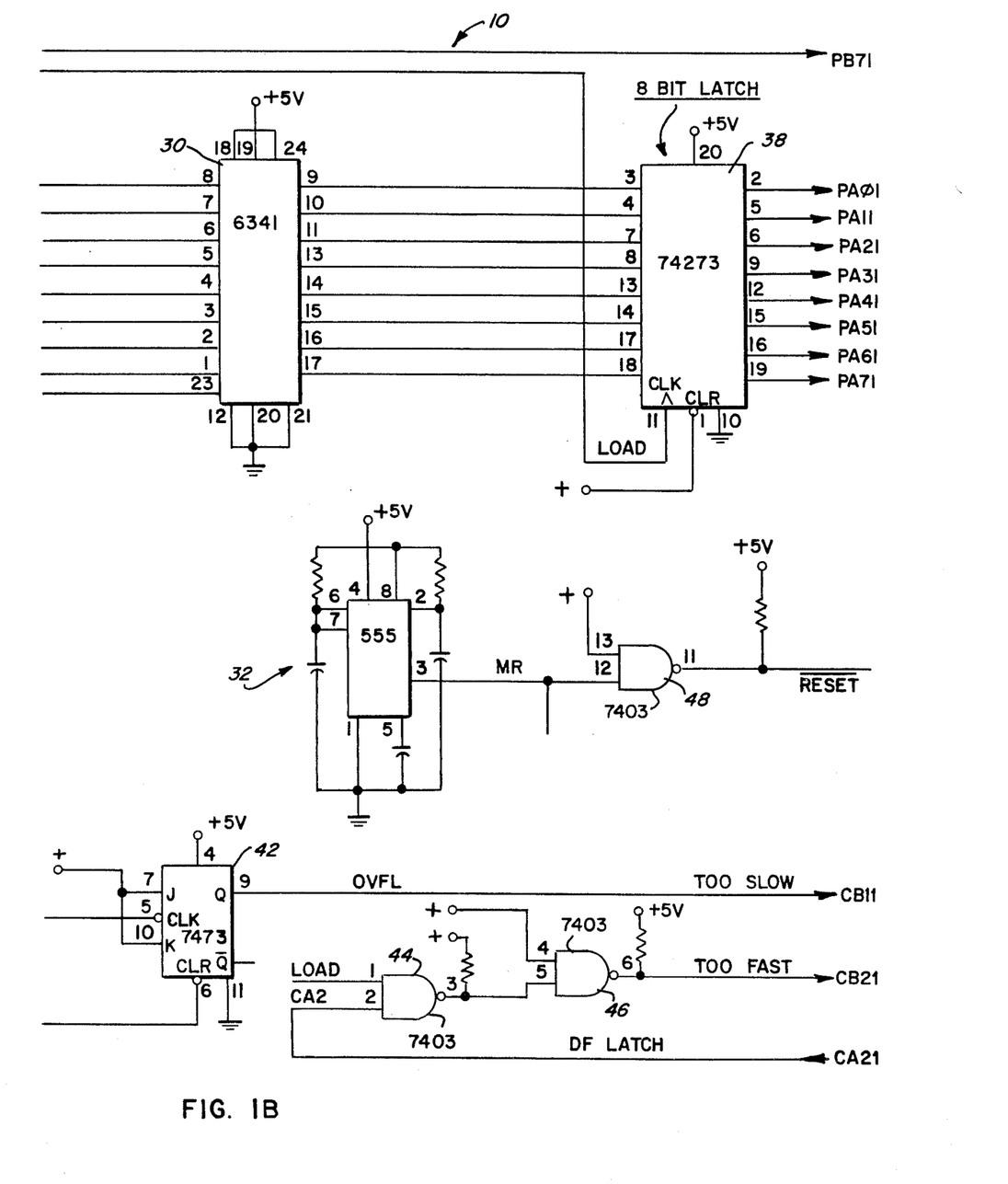

Referring now to the drawings, with particular attention to FIGS. 1a and 1b, there is shown a logarithmic converter according to the invention usable for a bar code reader utilizing a microprocessor. The logarithmic converter 10 is adapted to scan a bar coded record such as a record 12 by means of a light pen 14 which may be of conventional design. The output of the light pen 14 is an analog signal that is applied to an analog-to-digital converter 16 which converts the outputs of the light pen 14 into a two-state signal having, for example, a signal having a high state when a black bar is being scanned and a low state when a white bar is being scanned.

The output of the analog-to-digital converter 16 is applied to an input of a four-stage shift register 18 which receives clock pulses at its clock input from a clock 20. Consequently, when the output of the analog-to-digital converter is high, the outputs $Q_A$–$Q_D$ of the shift register 18 are sequentially clocked to a high state in synchronism with pulses from the clock 20. When the output of the analog-to-digital converter 16 is low, the outputs $Q_A$–$Q_D$ of the shift register 18 are sequentially clocked to a low state.

The output of clock 20 also drives a pair of divider circuits 22 and 24 that divide the frequency of the clock 20 to provide a lower frequency signal to a pair of counter circuits 26 and 28. In the present embodiment, the frequency of the clock 20 is approximately 1 mHz and the frequency of the signal applied to the counter 26 is approximately 50 kHz, but other frequencies may be used, depending upon the speed of scanning, the widths of the bars and spaces on the record 12 and other factors, such as the configuration of the reading circuitry.

The counter circuits 26 and 28 form a nine-bit counter that counts the output of the divider 24 and applies the count to nine inputs of a 512×8 read-only memory (ROM) 30. The ROM 30 contains 512 address locations, each capable of storing eight bits, and is programmed to store the logarithm of the count received from the counter circuits 26 and 28 with eight-bit accuracy compatible with commercially available microprocessors. The base of the logarithms is selected to provide optimum accuracy for any combination of read-only memory and microprocessor in a manner described in a subsequent portion of the specification.

In operation, the dividers 22 and 24 are reset when power is applied to the circuits by means of a power-on reset circuit 32 that provides an MR signal to reset the dividers 22 and 24 each time the power is turned on. The divider 24 continually applies a clock signal to the counter circuit 26 that is periodically reset by an exclusive-OR gate 34 whenever a transition in the signal from the analog-to-digital converter 16 occurs. The transition is sensed by the exclusive-OR gate 34 when one of the inputs to the exclusive-OR gate 34 is high and the other is low when a transition is shifted between the $Q_B$ and $Q_C$ outputs of the shift register 18. When no transition is present, both of the inputs of the exclusive-OR gate 34 are either high or low, and result in a low state output from the exclusive-OR gate 34. The counter circuit 28 is reset at the same time as the counter circuit 26 via an exclusive-OR gate 36 that functions as an inverter.

Following each reset, the counter circuits 26 and 28 begin to count the output of the divider circuit 24 and continuously apply the latest count to the read-only memory 30 which continuously applies a signal proportional to the logarithm of the received count to an eight-bit latch 38. The eight-bit latch 38 is normally maintained in a latched state and remains nonresponsive to the output of the read-only memory 30 during the counting process. When a transition is detected, an exclusive-OR gate 40 detects the transition passing between the $Q_A$ and $Q_B$ outputs of the four-stage shift register 18 and applies a LOAD signal to the clock input of the eight-bit latch 38, thus transferring the logarithm of the current count from the read-only memory 30 to the output of the latch 38. Following the next clock pulse from the clock 20, the transition shifts one step through the shift register 18, and the exclusive-OR gate 34 resets the counter circuits 26 and 28 to permit a count proportional to the width of the next bar or space to be accumulated. The above process is repeated each time a transition is detected, and causes the eight-bit latch 38 alternatively to present signals representative of the logarithms of the widths of the bars and spaces of the record 12 to a microprocessor.

The $Q_A$ output of the shift register 18 is sampled by the microprocessor to indicate whether the logarithm being presented by the latch 38 is representative of the width of a bar or of a space. A high state signal on the PB71 line is indicative of a bar, while a low state signal is indicative of a space.

An error checking circuit comprising a bistable multivibrator 42 operating as a tenth bit counter provides a high state output signal at its CB11 output if the record member 12 is scanned so slowly that the counter circuits 26 and 28 overflow. A pair of NAND gates 44 and 46 are responsive to the LOAD signal from the exclusive-OR gate 40 and to a CA21 output from the microprocessor to provide a TOO FAST signal at a CB21 output if the record member 12 is scanned so quickly that the microprocessor has not had time to complete the computation of the width of the previous bar or space. A signal on either the CB11 or CB21 line will terminate the scan and indicate to the operator that the scan was not completed. A NAND 48 connected as an inverter inverts the MR signal from the master reset circuit 32 to provide a $\overline{\text{RESET}}$ signal for the microprocessor.

The use of the logarithmic conversion circuits serves to compress the range of counts received from the counting circuits 26 and 28 and permits a standard eight-bit microprocessor to be used while maintaining adequate resolution of the system. This is in contrast to a circuit utilizing linear computation techniques, such as the type described in the referenced U.S. Pat. Nos. 3,784,792 and 3,886,521. Such a system would require a twelve-bit microprocessor if a mircroprocessor were used in place of the hard wired circuitry to achieve the same resolution as the circuit of the present invention. However, in order to achieve such resolution, since a logarithm is a nonlinear function, the base of the logarithms stored in the read-only memory 30 must be adjusted to match the counting resolution of the counting circuits 26 and 28 and the number of input bits of the microprocessor. In addition, the base of the logarithms must be tailored to match the expected ratio of widths of the wide and narrow areas of the record 12.

In the system of the referenced U.S. Pat. Nos. 3,784,792 and 3,886,521, the determination of whether a particular bar or space is wide or narrow is determined by comparing the width of that particular bar or space, as determined by the count in the counter, with the width of a previously scanned bar or space. The ratio of the widths of the bars or spaces being compared is computed, and if that ratio is greater than a predetermined constant, the first width is deemed to be wide and the second width is deemed to be narrow. If the ratio is less than a second predetermined constant (usually the reciprocal of the first predetermined constant), then the first width is deemed to be narrow and the second wide. If the value of the ratio is between the two constants, then the widths of the two areas are deemed to be equal.

These relations are described mathematically as follows:

$$\frac{x_1}{x_2} > K \text{ implies } x_1 > x_2 \tag{1}$$

$$\frac{x_1}{x_2} < \frac{1}{K} \text{ implies } x_1 < x_2 \tag{2}$$

$$K \geq \frac{x_1}{x_2} \geq \frac{1}{K} \text{ implies } x_1 = x_2 \tag{3}$$

where $x_1$ and $x_2$ represent the widths of two areas being compared and k is a constant. The areas represented by $x_1$ and $x_2$ may correspond to the widths of bars, the widths of spaces or a combination of bars and spaces.

In order to make the comparison between the areas represented by $x_1$ and $x_2$ logarithmically, the above three equations are converted to logarithmic form as follows:

$$\log \frac{x_1}{x_2} > \log K \tag{4}$$

$$\log \frac{x_1}{x_2} < \log \frac{1}{K} \tag{5}$$

$$\log K \geq \log \frac{x_1}{x_2} \geq \log \frac{1}{K} \tag{6}$$

By noting that the logarithm of the ratio of two numbers is equal to the difference of the logarithms of the numbers, and by selecting the base of the logarithms to be equal to the constant K, the above equations can be transformed into the following:

$$\log_K x_1 - \log_K x_2 > 1 \tag{7}$$

$$\log_K x_1 - \log_K x_2 < -1 \tag{8}$$

$$1 \geq (\log_K x_1 - \log_K x_2) \geq -1 \tag{9}$$

Consequently, by selecting the base of the logarithms to be equal to the limiting ratios of the widths of coded areas being compared, the difference in the logarithms representing the widths of the areas can readily be compared to 1 or −1 to simplify the calculations involved.

Figure 2:
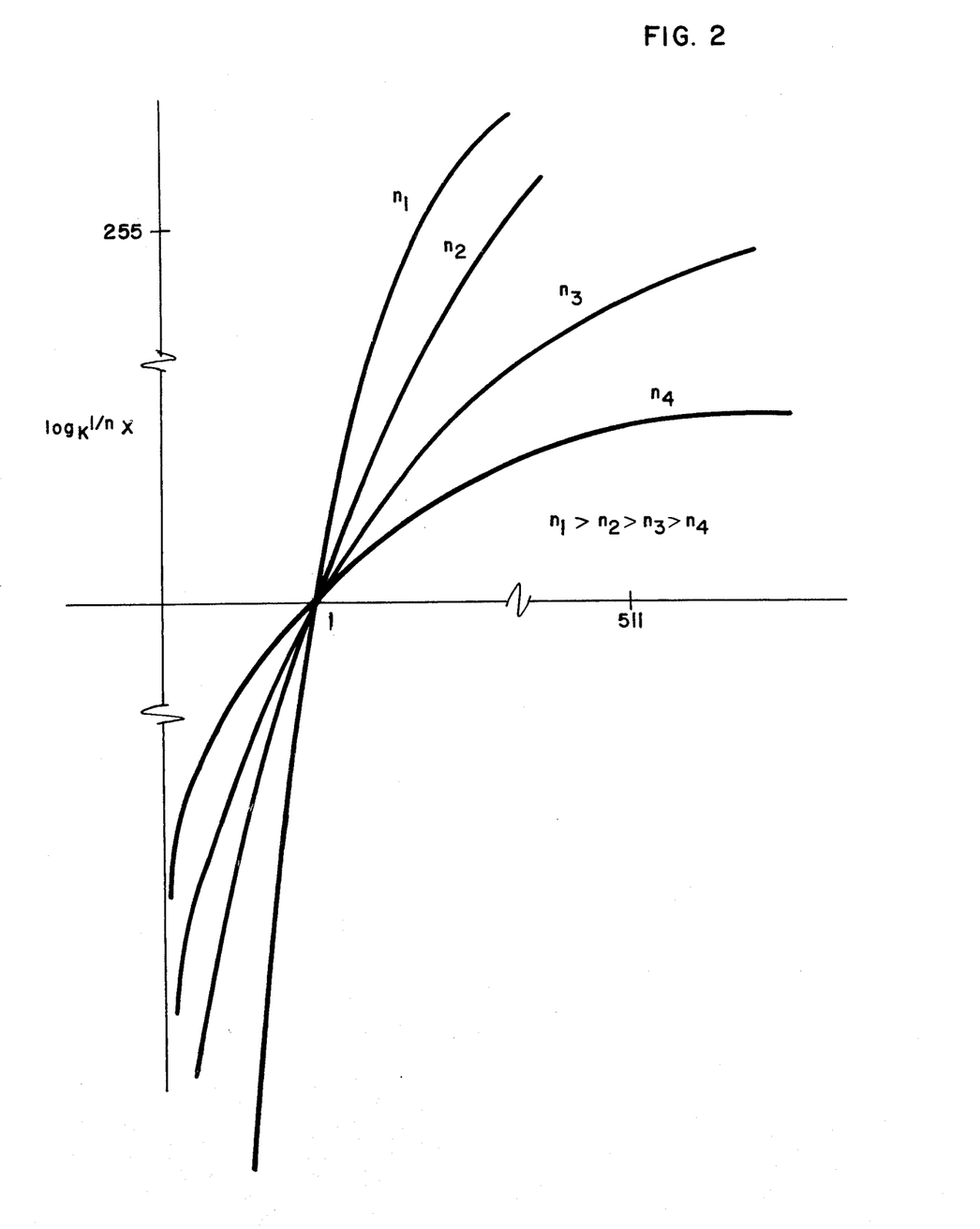
FIG. 2 is a graph of a logarithmic function showing the effects of the logarithmic base on the shape of the logarithmic curve.

However, the use of K as the base of the logarithms to which the width representations are converted may not provide optimum resolution and accuracy for the scanning system. This is because a logarithm is a nonlinear function. The nonlinearity is illustrated in FIG. 2 which shows a family of curves of the logarithmic function log x to a base of K raised to an inverse power for n for various values of n ranging from $n_1$ through $n_4$, where $n_1$ through $n_4$ represent various integer values.

In the circuit illustrated in FIGS. 1a and 1b, the widths of each of the scanned areas is first represented by a linear count having a predetermined number of bits determined by the frequency of the counting signal from the divider 24 and by the number of outputs of the counting circuits 26 and 28 (i.e., by the number of inputs to the read-only memory 30). The range of counts of the counting circuits 26 and 28 determines the portion of the logarithmic function over which the circuit will operate. This corresponds to a range of 0–511 along the X axis of FIG. 2 in the present embodiment.

The number of outputs of the read-only memory 30 determines the range of logarithmic values that can be obtained. This corresponds to the range of 0–255 along the Y axis of FIG. 2 for an eight-bit memory such as the ROM 30.

In order to optimize system resolution, it is desirable to adjust the value of n so that the logarithm of x ranges from 0 to 255 as x if varied from 0 to 511 for the structure of the present embodiment. This range corresponds to the range of counts obtained over the normal range of scanning speeds, and must accommodate the count corresponding to the widest bar or space at the lowest scanning speed, and the narrowest bar or space at the highest scanning speed. The selection of a value for n is accomplished in the following manner.

Since the value of the logarithm of x is limited, in the present embodiment, to a range of 0–255 by the number of outputs of the read-only memory 30, the following result is obtained.

$$\log_K \frac{1}{n} x \leq 255 \tag{10}$$

which can be transformed to:

$$\log_K x \leq \frac{255}{n} \tag{11}$$

Using logarithmic base conversion techniques, it is known that $$\log_K x = \frac{\log_e x}{\log_e K} \tag{12}$$

By substituting equation (12) into equation (11) and rearranging terms, the value of n can be determined for any value of K or x as follows:

$$n \leq 255 \frac{\log_e K}{\log_e x} \tag{13}$$

Substituting the values of 511 for x and 1.6 for K that are used in the present embodiment, the value of n becomes approximately 19.2 which when rounded off to the next integral value provides a value of n=19. Utilizing a similar approach for different maximum values of x, such as may be used in other embodiments, the corresponding values of n for x ranging from 0 to 1023 will be approximately 17.29. A range of x from 0 to 2047 provides a corresponding value of n of 15.71. Similarly, the values of n can be computed for various values of K and for systems capable of providing a logarithm of x having a maximum value other than 255. It should also be noted that although natural logarithms were used in the above computations for purposes of convenience, any logarithmic base may be used provided that the same base is used for all logarithmic functions in any given equation.

Equation (13) above can be generalized so that the value of n may be determined for any read-only memory having a predetermined number of inputs $G_1$ and a predetermined number of outputs $G_2$ defining the respective ranges of x and log x as follows:

$$n \leq (2^{G_1} - 1) \frac{\log K}{\log (2^{G_2} - 1)} \tag{14}$$

This equation can also be written in terms of the maximum value of the function log x and the maximum count, defined as $L_m$ and $C_m$, respectively, as follows:

$$n \leq L_m \frac{\log K}{\log C_m} \quad (15)$$

The above logarithms may be taken to the base e, the base 10 or to any convenient base. Base conversion is a multiplicative process, and for this reason, the quotient of two logarithms taken to the same base remains the same regardless of the base used.

When, as in the present embodiment, a value of 19 is selected for n, and the read-only memory 30 is programmed to convert the linear count applied to its nine inputs to a logarithm to the base of $(1.6)^{1/19}$, the decoding comparison is made according to the following equations:

$$\log_{(1.6)^{1/19}} x_1 - \log_{(1.6)^{1/19}} x_2 > 19 \quad (16)$$

$$\log_{(1.6)^{1/19}} x_1 - \log_{(1.6)^{1/19}} x_2 > -19 \quad (17)$$

If the first relation holds, the first area is wider than the second area, if the second relation holds, the first area is narrower than the second area; and if neither relation holds, the areas are considered to be equal. The above relations assure that the coded record 12 will be decoded with the optimum resolution possible from an eight-bit input microprocessor and a nine-bit counter. Similarly, equations (7), (8) and (9) may be rewritten for optimum accuracy as follows:

$$\log_{K^{(1/n)}} x_1 - \log_{K^{(1/n)}} x_2 > n \quad (18)$$

$$\log_{K^{(1/n)}} x_1 - \log_{K^{(1/n)}} x_2 < -n \quad (19)$$

$$n \geq (\log_{K^{(1/n)}} x_1 - \log_{K^{(1/n)}} x_2) \geq -n \quad (20)$$

Figure 3A:
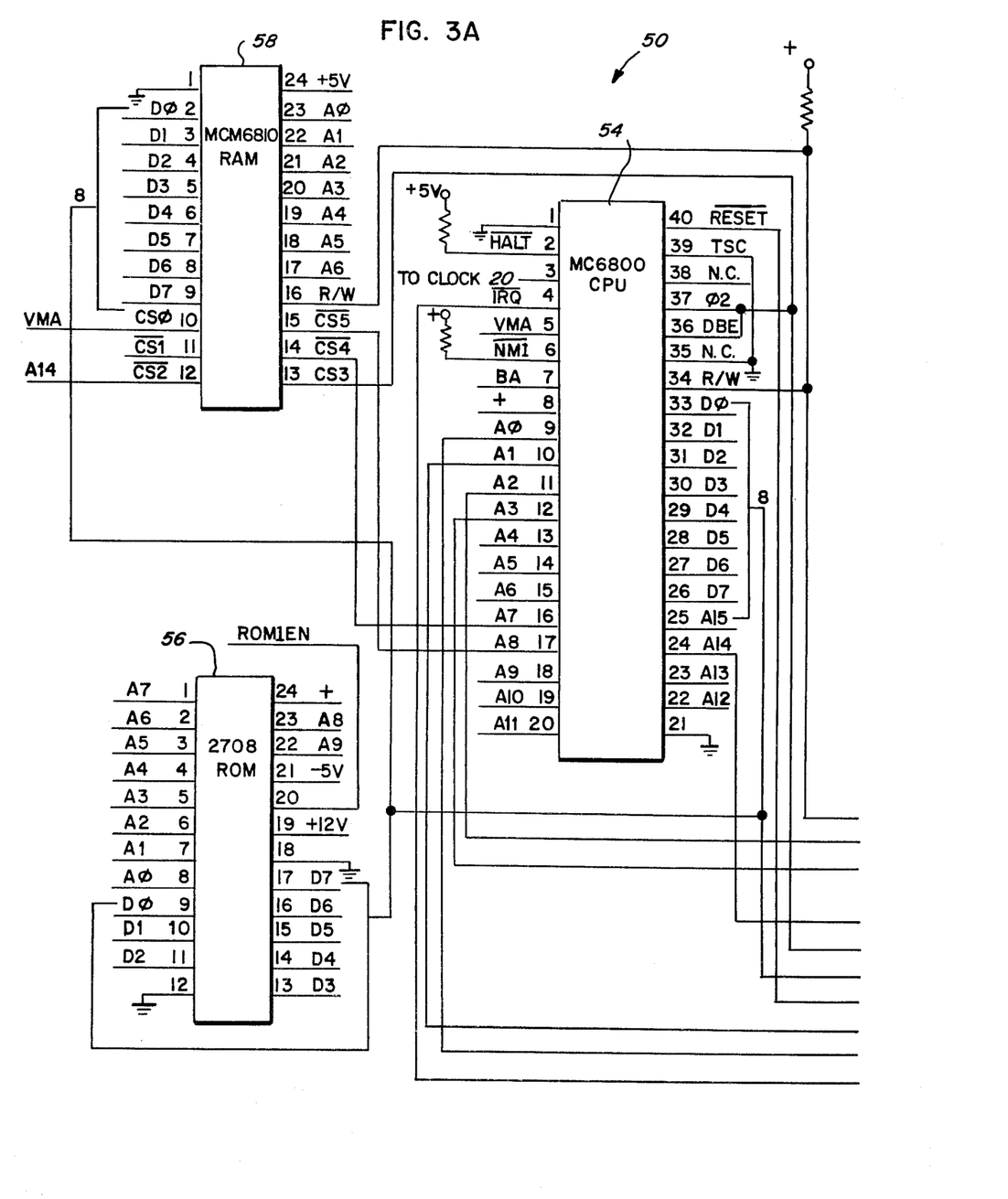
FIGS. 3a and 3b are a schematic diagram of a processor usable for processing the signals developed by the logarithmic converter illustrated in FIGS. 1a and 1b.
Figure 3B:
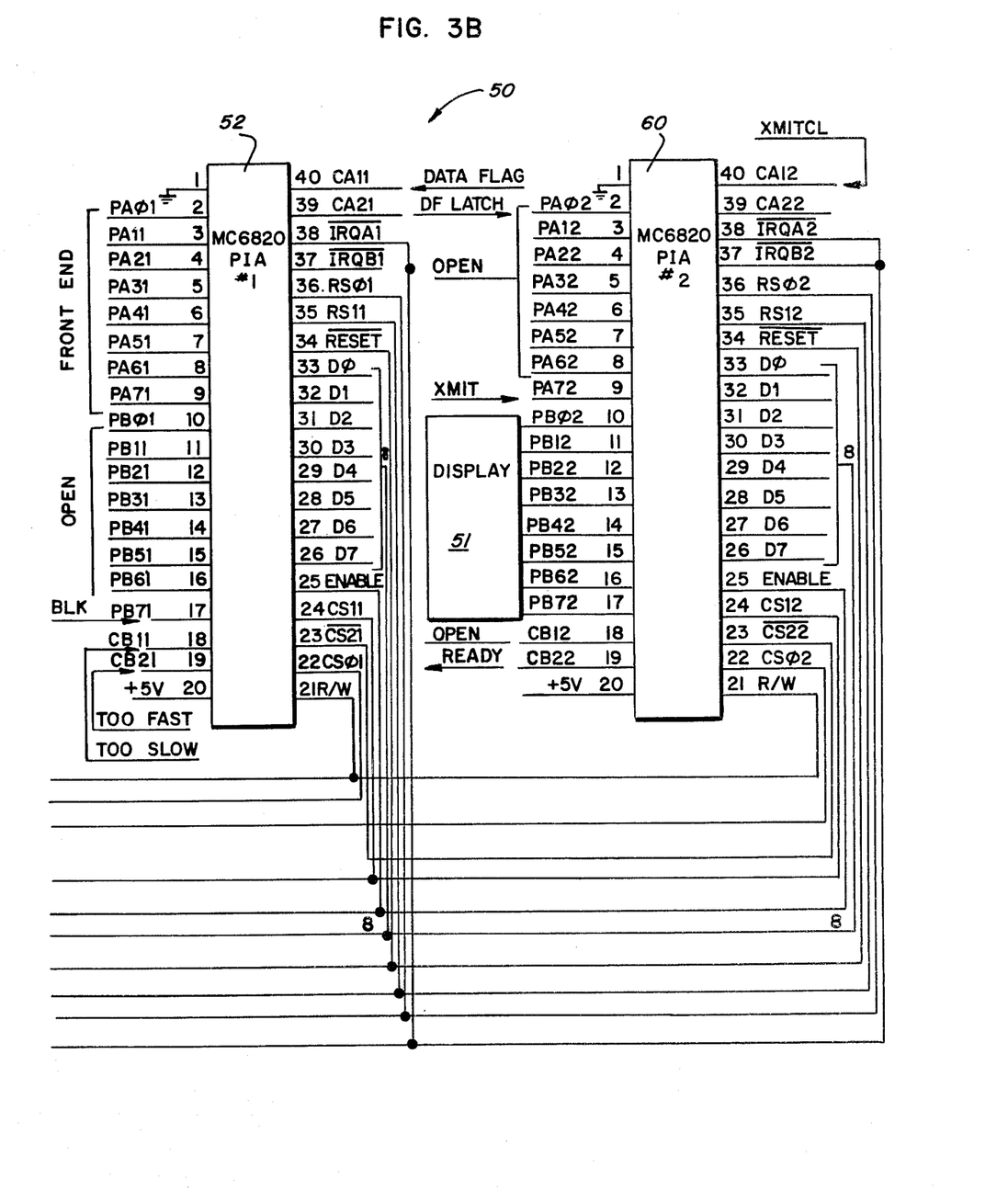

Once the logarithmic representations of widths have been obtained, they are sequentially presented by the latch 38 to a processor unit generally designated by the reference numeral 50 (FIGS. 3a and 3b). The processor unit 50 serves to decode the logarithmic representations and provides an output to an alphanumeric display unit 51 which presents the data in a human readable form. The data may also be recorded and tabulated in any conventional manner.

The eight outputs of the latch 38 (FIG. 1b) are applied to eight similarly designated inputs of a peripheral interface adapter 52 of the processor unit 50. In the present embodiment, the peripheral interface adapter 52 is an MC6820 peripheral interface adapter manufactured by Motorola, Inc. The peripheral interface adapter 52 receives the data from the latch 38 and converts it to a form usable by a microprocessor 54 within the microprocessor unit 50. The data is applied to the microprocessor 54 through eight lines D0-D7. In the present embodiment, the microprocessor 54 is an MC6800 microprocessor manufactured by Motorola, Inc., but any suitable eight-bit microprocessor may be utilized.

The microprocessor 54 is interconnected with a read-only memory 56 and a random-access memory 58. In the present embodiment, a type 2708 ROM and a type MCM 6810 RAM, manufactured by Motorola, Inc., are utilized as the ROM 56 and RAM 58, respectively, but any suitable memories may be used. A second peripheral interface adapter 60 similar to the peripheral interface adapter 52 serves to provide output signals suitable for use by the display unit 51.

In the present embodiment, the read-only memory 56 serves as a look-up table, and contains sequences representative of start codes, stop codes and data. The random-access memory 58 serves to store various program instructions, and works in conjunction with the microprocessor 54 to perform the necessary decoding functions in the proper sequence. Representative functions performed by the processor 50 include element checks to determine whether the record 12 is being scanned too fast (faster than the microprocessor can handle data) or too slowly, and also checks to determine whether the space between characters is excessive. Subsequently, a character check is made to determine whether the scanned character is valid by comparing the scanned character with characters stored in the read-only memory 56. At this stage a determination is made as to whether the record 12 is being scanned in the forward or reverse direction by looking up the appropriate start and reverse stop characters in the read-only memory 56. The message is then checked to determine whether the message contains the required number of characters, and the processing is terminated if a scan is not completed. All of the above functions, and others, including the decoding functions performed by the system described in the referenced U.S. Pat. Nos. 3,784,792 and 3,886,521, are performed by appropriately programming the processor 50. In the present embodiment, the microprocessor 50 is programmed in the M6800 assembly language described in the M6800 Microprocessor Programming Manual, Third Edition, published by Motorola, Inc., 1976. A copy of the program is appended to the present specification.

Obviously, many modifications and variations of the present invention are possible in light of the above teachings. Thus, it is to be understood, that within the scope of the appended claims, the invention may be practiced otherwise than as specifically described above.

What is claimed and desired to be secured by Letters Patent of the United States is:

1. A system for reading a record encoded with a plurality of coded areas having at least two predetermined widths, comprising:

means for scanning said record and for providing a binary signal representative of the width of each of the individual areas scanned;

means responsive to said binary signal for providing a second binary signal representative of the logarithm of the width of each of the individual areas scanned, each of said signals having a predetermined maximum value, said logarithms having a predetermined base having a value predeterminedly related to said maximum value in order to provide optimum resolution of said widths; and digital processing means coupled to said scanning and providing means and responsive to differences in the logarithm representative signals for decoding said encoded record.

2. A system as recited in claim 1 wherein said digital processing means includes means responsive to said differences in said representations of logarithms of said widths for providing an indication when the ratio of said widths exceeds a predetermined number, and wherein the base of said logarithms is proportional to said predetermined number.

3. A system as recited in claim 1 wherein said digital processing means includes means responsive to said differences in said representations of logarithms of said widths for providing an indication when the ratio of said widths is less than a predetermined number, wherein the base of said logarithms is proportional to said predetermined number.

4. A system as recited in claim 3 wherein said base of said logarithms is inversely proportional to said predetermined value.

5. A system for reading a record having a plurality of coded areas of different widths, comprising:
means for scanning said coded areas and providing a digital signal having a count directly proportional to the width of each of said scanned areas, said count having a predetermined maximum value;
means responsive to said digital signal for producing a signal representative of the logarithm of the value of said count to a predetermined base, said signal representative of the logarithm of said count having a second predetermined maximum value, said base being predeterminedly related to the predetermined maximum value of said count and to said second predetermined maximum value; and
means responsive to said logarithm representative signal for comparing the widths of predetermined ones of said scanned coded areas, said width comparing means including means for providing a first indication when the difference of the count of said logarithm representative signal representative of the widths of two of said scanned coded areas exceeds a predetermined number and for providing a second indication when the difference of the count of said logarithm representative signal representative of the widths of two of said scanned areas is less than the negative of said predetermined number, said base being proportional to said predetermined number.

6. A system as recited in claim 5 wherein said base of said logarithms is equal to $K^{1/n}$, where K is equal to said predetermined number, and wherein n does not exceed $$L_m \frac{\log K}{\log C_m}$$

where $C_m$ is the predetermined maximum value of said count, $L_m$ is said second predetermined maximum value and log K and log $C_m$ are logarithms of the respective quantities taken to any predetermined common base.

7. A system as recited in claim 5 further including means responsive to said first and second indication providing means for decoding said coded areas.

8. A system for reading a record having a plurality of coded areas of different widths, comprising:
means for scanning said areas of said record and providing a first digital signal representative of the width of each of said scanned areas, the width of each of said scanned areas being defined by a first group of bits containing a first predetermined number of bits of said first digital signal;
means responsive to said scanning means for providing a second digital representative of the logarithm of the widths of each of said scanned areas, said second digital signal providing means being operative to provide a second group of bits containing a second predetermined number of bits of said second digital signal in response to each first group of bits to define the logarithm of the width of each of said scanned areas, the base of each logarithm of width being predeterminedly related to the number of bits contained in said first and second groups of bits; and
means responsive to said second digital signal for comparing the widths of predetermined ones of said scanned areas, said comparing means including means for providing a first indication when the difference of the logarithms of the widths of two of said scanned areas exceeds a predetermined number, and for providing a second indication when the difference of the logarithms of the widths of said scanned areas is less than a second predetermined number.

9. A system as recited in claim 8 wherein said second predetermined number is equal to the negative of said predetermined number.

10. A system as recited in claim 9 wherein the base of each logarithm is predeterminedly related to said predetermined number.

11. A system as recited in claim 10 wherein said comparing means includes means responsive to said digital signal for providing an indication whenever the ratio of the widths of said predetermined areas exceeds a predetermined ratio, and wherein the base of each logarithm is equal to $K^{1/n}$ where K is equal to said predetermined ratio and n is equal to said predetermined number.

12. A system as recited in claim 11 wherein said predetermined number does not exceed $$(2^{G_1} - 1) \frac{\log K}{\log (2^{G_2} - 1)}$$

where $G_1$ is the number of bits contained in said first group of bits, $G_2$ is the number of bits contained in said second group of bits and log K and log $(2^{G_2} - 1)$ and the logarithms of the respective quantities to any common base.

13. A system as recited in claim 12 wherein said second digital signal providing means includes a read-only memory.

14. A system as recited in claim 13 further including means responsive to said indication providing means for decoding said record.

15. A system for reading a record having a plurality of coded areas of different widths, comprising:
means for scanning said areas of said record and providing a first digital representation of the width of each of said scanned areas;
means responsive to said first digital representation for providing a second digital representation of the logarithm of the width of each of said scanned areas; and
means responsive to said second digital representation providing means for comparing the widths of predetermined ones of said scanned areas, said comparing means including means for subtracting the representations of the logarithms of the widths of two of said scanned areas and providing a first indication when the ratio of the widths of two of said scanned areas exceeds a predetermined number and for providing a second indication when the ratio of the widths of two of said scanned areas is less than the reciprocal of said predetermined number, wherein said second digital representation providing means includes means for providing said second digital representation to a logarithmic base proportional to said predetermined number.

16. A system as recited in claim 15 wherein each first digital representation contains a first predetermined number of bits, and each second digital representation contains a second predetermined number of bits, and wherein said logarithmic base is predeterminedly related to the number of bits contained in said first and second representations.

17. A system as recited in claim 16 wherein said logarithmic base does not exceed $$(2^{G_1} 1) \frac{\log K}{\log (2^{G_2} - 1)}$$

where $G_1$ is the number of bits contained in said first representation, $G_2$ is the number of bits contained in said second representation, K is equal to said predetermined number and log K and log $(2^{G_2}-1)$ are logarithms of the respective quantities to any common base.

18. A system as recited in claim 16 wherein said second digital representation providing means includes a read-only memory having a plurality of inputs equal in number to said first predetermined number of bits and a plurality of outputs equal in number to said second predetermined number of bits.

19. A system as recited in claim 18 further including means responsive to said indication providing means for decoding said record.

20. The method of reading a record having a plurality of coded areas of different widths thereon, comprising the steps of:
scanning said record and providing a predetermined number of bits representative of the width of each of the coded areas scanned, generating in response to said predetermined number of bits a second predetermined number of bits representative of the logarithm of the width of each of the coded areas scanned, said logarithm being taken to a predetermined base predeterminedly related to said number of bits and said second number of bits and selected to provide optimum resolution of said widths; and
subtracting the logarithms of the widths of predetermined ones of said coded areas scanned and providing an indication when the ratio of the widths of two of the coded areas scanned exceeds a predetermined number, said predetermined number having a predetermined relationship to the predetermined base.

21. A system for reading a record encoded with a plurality of coded areas having at least two predetermined widths, comprising:
means for scanning said record and for providing a binary signal having a predetermined number of bits representative of the width of each of the individual areas scanned;
means responsive to said binary signal for providing a second predetermined number of bits representative of the logarithm of the width of each of the individual areas scanned, said logarithms having a base having a value predeterminedly related to said number of bits and to said second number of bits in a manner selected to provide optimum resolution of said widths; and
digital processing means coupled to said scanning and providing means and responsive to differences in the binary signals representative of the logarithms of said widths for decoding said encoded record.

* * * * *